US010955052B2

(12) United States Patent
Hoegerle et al.

(10) Patent No.: US 10,955,052 B2
(45) Date of Patent: Mar. 23, 2021

(54) METHOD FOR CONTROLLING AN AXIAL PISTON PUMP AND DRIVE UNIT WITH SUCH AN AXIAL PISTON PUMP AND HYDROSTATIC TRACTION DRIVE WITH SUCH A DRIVE UNIT

(71) Applicant: Robert Bosch GmbH, Stuttgart (DE)

(72) Inventors: Alexander Hoegerle, Schelklingen (DE); Franz Werner, Langenau (DE); Matthias Mueller, Langenau (DE); Norman Brix, Leipheim (DE); Ronny Herrmann, Neu-Ulm (DE); Sophia Karg, Pfaffenhofen (DE); Steffen Mutschler, Neu-Ulm (DE); Tobias Mueller, Lauingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/583,577

(22) Filed: Sep. 26, 2019

(65) Prior Publication Data
US 2020/0103023 A1  Apr. 2, 2020

(30) Foreign Application Priority Data

Sep. 28, 2018  (DE) ..................... 10 2018 216 750.8

(51) Int. Cl.
F16H 61/438 (2010.01)
F15B 11/17 (2006.01)
F16H 61/435 (2010.01)
F16H 39/42 (2006.01)
F16H 61/4008 (2010.01)
F16H 61/431 (2010.01)
E02F 9/22 (2006.01)

(52) U.S. Cl.
CPC ............ F16H 61/438 (2013.01); F15B 11/17 (2013.01); F16H 39/42 (2013.01); F16H 61/4008 (2013.01); F16H 61/431 (2013.01); F16H 61/435 (2013.01); E02F 9/2253 (2013.01)

(58) Field of Classification Search
CPC ..... F16H 61/431; F16H 61/433; F16H 61/438
See application file for complete search history.

(56) References Cited

U.S. PATENT DOCUMENTS

2004/0003590 A1* 1/2004 Kado ................... F16H 61/438
60/431
2009/0301073 A1* 12/2009 Mueller ................... B60T 1/10
60/327

(Continued)

Primary Examiner — Abiy Teka
Assistant Examiner — Matthew Wiblin
(74) Attorney, Agent, or Firm — Maginot, Moore & Beck LLP

(57) ABSTRACT

In a drive unit which has an axial piston pump and an electronic control unit, the axial piston pump is pivoted with a method in which pressure-reducing valves which act in opposition to one another are suddenly energized. Since in this respect no orifices are provided in the adjustment device, a so-called initiation jump of the excited current gives rise to a sudden reduction in the assigned actuating pressure or the actuating pressure difference formed therefrom. Then, a zero crossover jump of the excited current or of the excited currents is carried out in order to overcome the centering spring and therefore ensure a continuous zero crossover of the axial piston pump. Furthermore, a hydrostatic traction drive includes such a drive unit.

16 Claims, 6 Drawing Sheets

(56) References Cited

U.S. PATENT DOCUMENTS

| | | | | |
|---|---|---|---|---|
| 2010/0083652 A1* | 4/2010 | Fukuda | ............... | F16H 61/421 |
| | | | | 60/487 |
| 2014/0033691 A1* | 2/2014 | Peterson | ............. | E02F 9/2235 |
| | | | | 60/327 |
| 2014/0236433 A1* | 8/2014 | Mueller | ............... | F16H 61/462 |
| | | | | 701/51 |
| 2016/0082966 A1* | 3/2016 | Kaneko | ............. | B60W 30/188 |
| | | | | 701/84 |
| 2016/0257538 A1* | 9/2016 | Oiwa | ................... | F16H 61/431 |
| 2018/0170385 A1* | 6/2018 | Ornella | .................. | B60K 6/12 |
| 2018/0231121 A1* | 8/2018 | Witte | ..................... | F16H 61/42 |
| 2019/0226579 A1* | 7/2019 | Zhang | ............... | F16H 61/4157 |

\* cited by examiner

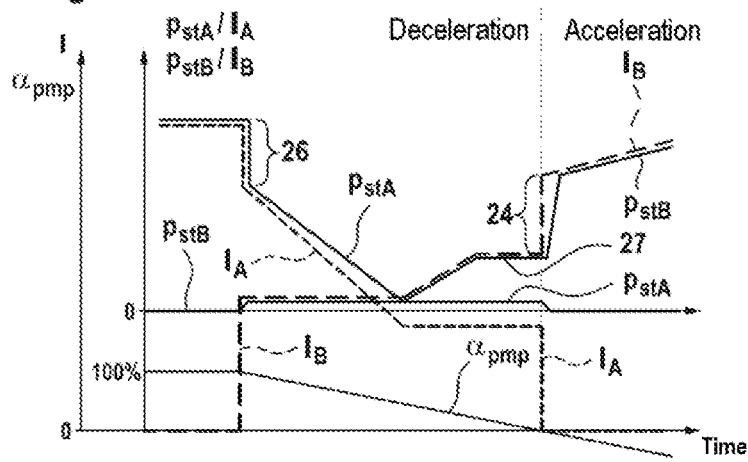
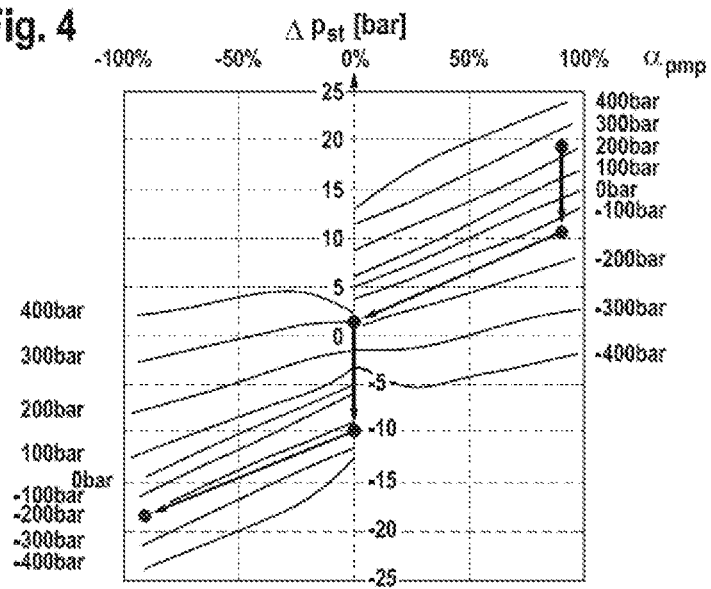

|  | Gentle 0% | | Moderate 50% | | Aggressive 100% | |
| --- | --- | --- | --- | --- | --- | --- |
|  | Low | High | Low | High | Low | High |
| Initiation jump [%] | 0 | 20 | 5 | 30 | 5 | 80 |
| Deceleration ramp [%/s] | 10 | 25 | 15 | 50 | 20 | 100 |
| Acceleration ramp [%/s] | 10 | 25 | 15 | 50 | 20 | 100 |

Fig. 8

METHOD FOR CONTROLLING AN AXIAL PISTON PUMP AND DRIVE UNIT WITH SUCH AN AXIAL PISTON PUMP AND HYDROSTATIC TRACTION DRIVE WITH SUCH A DRIVE UNIT

CLAIM OF PRIORITY

This application claims priority under 35 U.S.C. § 119 to application no. DE 10 2018 216 750.8, filed on Sep. 28, 2018 in Germany, the disclosure of which is incorporated herein by reference in its entirety.

TECHNICAL FIELD

The disclosure relates to a method for controlling a pivotable axial piston pump and to a drive unit which has such an axial piston pump and an electronic control unit. Finally, the disclosure relates to a hydrostatic traction drive with such a drive unit.

BACKGROUND

From the prior art it is known to adjust the swept volume of pivotable axial piston pumps for hydrostatic traction drives for mobile working machines (e.g. for wheel loaders) by means of an actuating cylinder, in order thereby to select the velocity and change the direction of travel. In this context, the actuating cylinder can be embodied as a synchronizing cylinder with two actuating chambers, to whose actuating chambers actuating pressure can be applied on opposite sides and therefore in opposite adjustment directions. The actuating pressure in the two actuating chambers is respectively regulated by means of an electroproportional pressure-reducing valve.

The actuating piston is prestressed into a central position by means of two centering springs which act in opposition to one another. In this context, the two centering springs on the actuating piston act counter to the pivoting out or pivoting of the axial piston pump. Each centering spring has a stop so that its restoring force does not act beyond the central position. The minimum current of the pressure-reducing valves is typically set in such a way that with this current the axial piston pump just pivots counter to the restoring force, acting on the actuating piston, of the respective centering spring.

In the dynamic change of direction of travel or reversing of the hydrostatic traction drive which is driven with such an axial piston pump it is known that the respective mobile working machine changes directly from deceleration into acceleration and does not stay in a stationary state in the process.

According to the prior art, adjustment devices are used with orifices through which the actuating pressure medium flows during the pivoting. The orifices can be arranged either in the inflow to the actuating chambers or in the outflow to the tank. Owing to the pivoting dynamics (high volume flow into the one actuating chamber, identical volume flow out of the other actuating chamber) a ram pressure which is sufficient for the axial piston pump to be able to pivot through the zero position virtually without a stationary state is produced at the orifices. While the axial piston pump is pivoting, a pressure at the orifice drops. As soon as the axial piston pump remains stationary at the zero crossover even for only a fraction of a second, the volume flow of the actuating pressure medium via the orifice becomes zero and a pressure equalization takes place.

For example, in each case an orifice is arranged in the inflow to the two actuating chambers, and reversing from forward travel into reverse travel is to take place. During the pivoting back from the forward delivery of the axial piston pump, the actuating pressure builds up in a slowed-down fashion on this side. Therefore, the energization of the reverse pressure-reducing valve already begins before the axial piston pump is actually pivoted into the zero position. The reverse pressure-reducing valve builds up a pressure (of e.g. 13 bar) at the orifice from the reverse side. However, owing to the volume flow via the orifice a relatively low actuating pressure (e.g. just 3 bar) builds up in the reversing actuating chamber. As soon as the axial piston pump remains stationary in the zero position, the full actuating pressure (e.g. 13 bar) is also present in the reversing actuating chamber and the adjustment can only then overcome the centering.

The orifices of the adjustment devices according to the prior art continue to have the following disadvantages:

1. The orifices have to be selected for the application of the machine.
2. The orifices increase the product variance considerably.
3. Installation space has to be provided for orifices which can be replaced/applied.
4. The orifices reduce the pivoting dynamics and therefore make the precise highly dynamic control of the pump more difficult.
5. The orifice diameter is only optimum for one operating point/one pivoting dynamic. If the ram pressure at the orifice is sufficient for a continuous zero crossover even at low pivoting speeds, the dynamics of the axial piston pump are greatly restricted.

SUMMARY

In contrast, the disclosure is based on the object of providing a method for controlling a pivotable axial piston pump and a drive unit therewith, and a hydrostatic traction drive with such a drive unit, with which these disadvantages are overcome.

This object is achieved by means of a method having the features disclosed herein, by means of a drive unit having the features disclosed herein, and by means of a traction drive having the features disclosed herein.

The pivotable axial piston pump which is controlled by the method according to the disclosure has an adjustment device which has a double-acting actuating cylinder with two actuating chambers which act in opposition to one another and with two centering springs which act in opposition to one another. The two actuating chambers can be supplied with actuating pressure medium by means of in each case one pressure-reducing valve. The orifices of the adjustment device (known from the prior art) are dispensed with, and the effect thereof during the reversing and, in particular, during the zero crossover of a pivoting angle can be modeled. The basis for this is the detection of a time of this zero crossover. The second current (reversing current) implements a zero crossover jump approximately at this time and therefore a sudden increase in the second actuation pressure. The first current for the first pressure-reducing valve (e.g. forward current) is deactivated preferably approximately at the time.

"Approximately" means in this context e.g. a time window of a tenth of a second before the zero crossover and up to the zero crossover.

The disclosed method permits a continuous change of direction of travel without restriction of the dynamics by means of the pump adjustment, reduced variance and reduced costs of the axial piston pump. In addition, the controllability of the axial piston pump is improved, which is advantageous specifically during positioning.

The zero crossover jump of the second current preferably occurs in accordance with a rate of change of the pivoting angle shortly before the zero crossover.

"Shortly before the zero crossover" means in this context e.g. a time at which the pivoting angle has approximately 0.5% residual pivoting angle.

In one particularly preferred development of the method according to the disclosure, an actuating pressure difference is defined or calculated as a first actuating pressure minus the second actuating pressure. This actuating pressure difference is suddenly raised or suddenly lowered by means of the two pressure-reducing valves at the time of the zero crossover in accordance with a reversing direction of the axial piston pump. To be more precise, when there is a change in the delivery direction of the axial piston pump, the actuating pressure difference is suddenly raised from forward to reverse. In the case of a change in the delivery direction of the drive shaft from reverse to forward the actuating pressure difference is suddenly lowered.

In one particularly preferred development of the method according to the disclosure, the sudden raising or lowering of the actuating pressure difference occurs by the summed equivalent of the two centering springs. If e.g. the two centering springs each have an equivalent of 5 bar, the actuating pressure difference is raised or lowered by 10 bar.

The pivoting angle of the axial piston pump can be measured by means a pivoting angle sensor in order thereby to detect the zero crossover.

The pivoting angle of the axial piston pump can be calculated by means of the volume flow balance from a consumer volume flow, a leak and a rotational speed of the axial piston pump, in order thereby to detect the zero crossover.

The consumer volume flow is preferably a displacement volume flow of a hydraulic motor or of a hydrostatic traction drive which is formed with the drive unit according to the disclosure.

The pivoting angle of the axial piston pump can be parameterized empirically on the basis of a velocity of a mobile working machine, which is driven by the hydrostatic traction drive. For example, in the case of a defined mobile working machine and a defined deceleration of $-1$ m/s$^2$ the zero crossover always takes place at e.g. 0.5 km/h. Various values are preferably stored in a table and selected by means of software. The zero crossover can therefore be detected.

In addition, it is possible to dispense with a hydraulic pressure cut-off for the reversing process if the rising current limits the actuating pressure to a pressure cut-off level.

Furthermore, during the change in direction of travel the current must be switched on on the second side (e.g. reversing side) and switched off on the first side (e.g. forward side). As a result of the elimination of the orifices, a change in current results directly in a change in actuating pressure. So that the driver does not perceive this as a disruptive jolt, the second current (e.g. reversing current) is preferably actuated at the moment at which the pivoting back of the pivoting angle or the deceleration of the mobile working machine begins. In this context, a second prestressing current is preferably selected which increases the second actuating pressure only to a minimum.

An initiation jump can be implemented by virtue of the fact that the second current is suddenly increased to the prestressing current and/or the first current is suddenly reduced.

In one particularly preferred development of the method according to the disclosure, the first current is reduced at least temporarily along a ramp between the initiation jump and the zero crossover jump and/or the second current is increased at least temporarily along a ramp. If the actuating pressure difference is formed, this is reduced along a ramp.

Scaling of the initiation jump and/or of the ramps and/or of a pressure cut-off level of the axial piston pump preferably occurs by means of a parameter which can be represented as a function.

The function or the parameter depends on the velocity of the mobile working machine or on a rotational speed of a hydraulic motor which is fluidically connected to the axial piston pump, in order to form a hydrostatic traction drive. The aggressivity of the deceleration is therefore changed in order to relieve the loading on the hydraulic motor or other components of the hydrostatic traction drive. This relieving of loading can be in the form, in particular, of the prevention of high working pressures at high rotational speeds of the hydraulic motor.

In the case of an increasing velocity of the mobile working machine or in the case of the increasing rotational speed of the hydraulic motor, the initiation jump is reduced and/or the ramps are flattened and/or the pressure cut-off level is reduced.

A pressure cut-off of the axial piston pump preferably occurs by means of parameterizable limitation of the current during the deceleration. Therefore, there is no need for any wastage of energy by a pressure-limiting valve in the case of a limiting value working pressure.

In one preferred development of the method, protection of an internal combustion engine of the working machine against an excessive rotational speed during the deceleration is implemented by means of a characteristic curve concept which is described with respect to FIG. 7.

A desired driving dynamic of the mobile working machine is preferably converted into parameters of the function wherein the parameters of the function are adjusted jointly and coupled to one another in accordance with the desired behavior of the mobile working machine via a parameterizing interface. This is shown by way of example with respect to FIG. 8.

The desired driving dynamics can be described here in accordance with an accelerator pedal position or a rotational speed of an internal combustion engine.

The driving unit according to the disclosure is configured for a traction drive and has a pivotable axial piston pump with an adjustment device and an electronic control unit. The adjustment device has a double-acting actuating cylinder with two actuating chambers which act in opposition to one another and with two centering springs which act in opposition to one another. An actuating pressure medium can be supplied and an actuating pressure can be applied to the two actuating chambers by means of in each case one pressure-reducing valve. The method described above can be controlled with the electronic control unit.

The hydrostatic traction drive according to the disclosure is configured for a mobile working machine and has a drive unit as described above and at least one hydraulic motor which is fluidically connected to the axial piston pump of the drive unit in a closed circuit.

In one particularly preferred development of the traction drive according to the disclosure, an actuating pressure difference can be calculated or is defined as a first actuating pressure minus the second actuating pressure by means of the control unit. The actuating pressure difference can be suddenly raised or suddenly lowered by the electronic control unit by means of the two pressure-reducing valves approximately at the time of the zero crossover in accordance with a type of change of the direction of travel of the mobile working machine. For a change in direction of travel from forward travel to reverse travel the defined actuating pressure difference can be suddenly raised. For a change in direction of travel from reverse travel to forward travel the defined actuating pressure difference can be suddenly lowered.

BRIEF DESCRIPTION OF THE DRAWINGS

An exemplary embodiment of a driving unit according to the disclosure with which the method according to the disclosure is carried out is illustrated in the figures, of which:

FIG. 3 shows a profile of the pivoting angle of the axial piston pump during the reversing process with actuating pressure profiles and current profiles, FIG. 4 shows how the axial piston pump is controlled in the reversing process against the background of its characteristic diagram, FIG. 8 shows adjustment of the desired reversing behavior.

FIG. 1 shows a circuit diagram of the exemplary embodiments of the drive unit according to the disclosure. FIG. 2 shows a circuit diagram only of the components of the drive unit from FIG. 1 which are relevant for the disclosed method.

Figure 1:
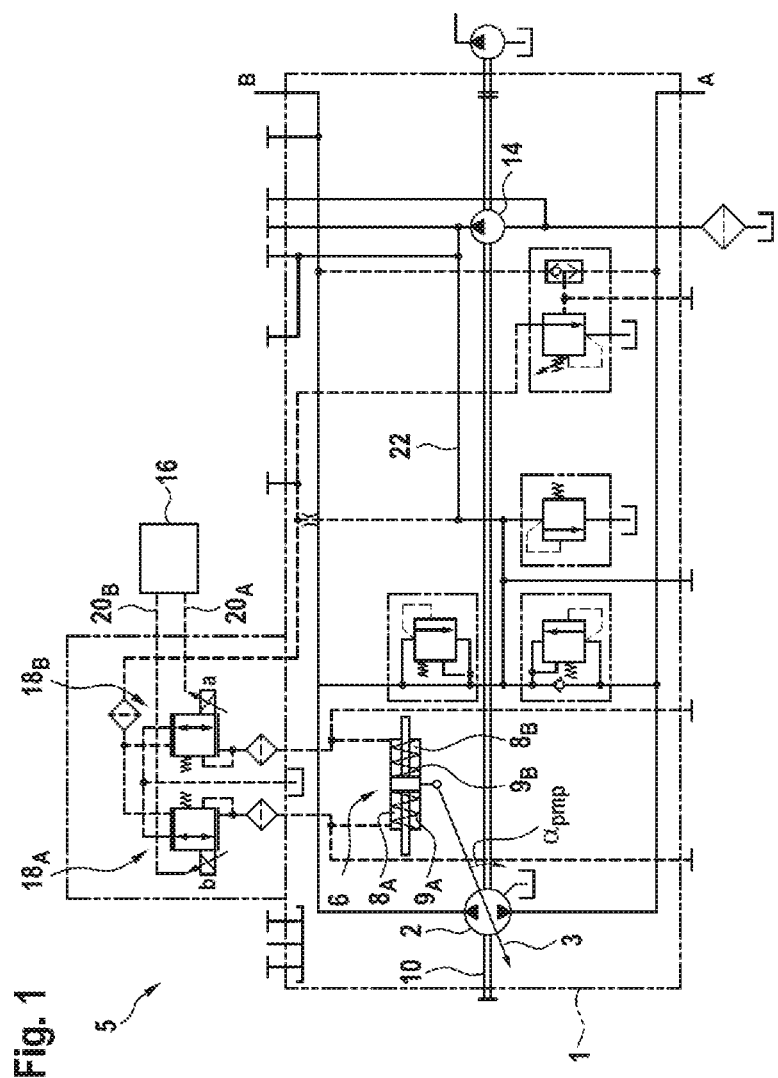
FIG. 1 shows a circuit diagram of the exemplary embodiment of the drive unit according to the disclosure.
Figure 2:
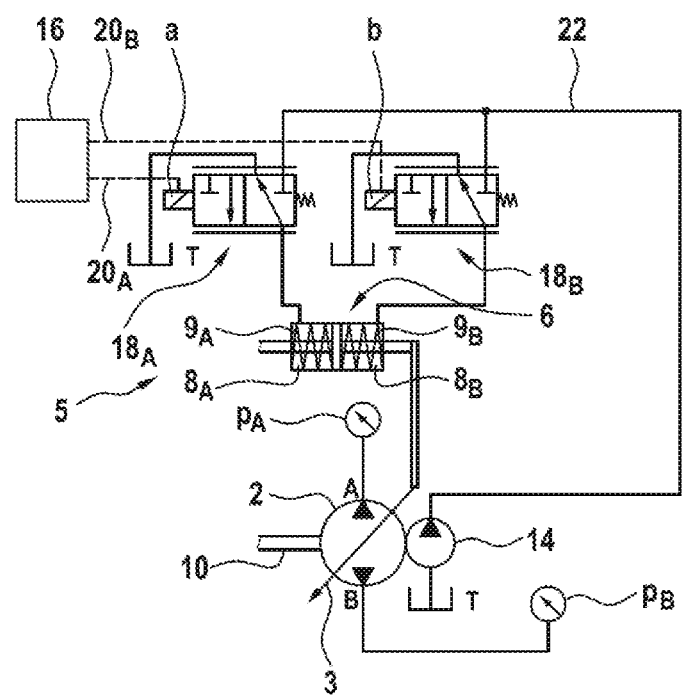
FIG. 2 shows a simplified circuit diagram of the drive unit from FIG. 1.

A pivotable axial piston pump has a housing 1 on which two working connections A, B are arranged and to each of which a working line of a closed circuit is connected. A traction drive is therefore formed for a mobile working machine (not shown).

The axial piston pump has a drive unit 2 which is embodied with a swash plate 3, the pivoting angle $\alpha_{pmp}$ of which can be adjusted by means of an adjustment device 5. A double-acting actuating cylinder 6, which has a first actuating chamber $8_A$ and a second actuating chamber $8_B$ acting in opposition thereto, is used for this.

In each actuating chamber $8_A$, $8_B$ a centering spring $9_A$, $9_B$ is arranged which forces the piston in the direction of the central position. A respective stop (not shown) prevents the centering spring $9_A$, $9_B$ also being active beyond the central position.

A first actuating pressure $p_{stA}$ acts in the direction of increasing the pivoting angle $\alpha_{pmp}$ of the axial piston pump in the first actuating chamber $8_A$ and in the direction of increasing its swept volume $\text{Vol}_{pmp}$ in a first delivery direction. This is counteracted by a second actuating pressure $p_{stB}$ in the second actuating chamber $8_B$ in the direction of reducing the pivoting angle $\alpha_{pmp}$ and therefore in the direction of reducing the swept volume $\text{Vol}_{pmp}$ in the first delivery direction.

Because of the pivotability of the axial piston pump, the first actuating pressure $p_{stB}$ acts in the direction of increasing the pivoting angle $\alpha_{pmp}$ of the axial piston pump and therefore in the direction of increasing its swept volume $\text{Vol}_{pmp}$ in an opposing delivery direction.

An actuating pressure difference $\Delta p_{st} = p_{stA} - p_{stB}$ is defined, wherein according to the definition this actuating pressure difference $\Delta p_{st}$ always acts in the direction of increasing the pivoting angle $\alpha_{pmp}$ or the swept volume $\text{Vol}_{pmp}$ in the first delivery direction.

By means of a drive shaft 10 of the axial piston pump, the drive unit 2 thereof is driven, and beyond that also a feed pump 14 with a rotational speed $n_{pmp}$.

The drive shaft 10 of the axial piston pump is driven by an internal combustion engine (not shown) which is preferably a diesel engine and whose crankshaft rotates at a rotational speed $n_{Eng}$.

The axial piston pump supplies, via its working connections A, B, one or more traction motors (not shown) of the mobile working machine in a closed circuit. In the forward travel, the first working pressure $p_A$ acts in the direction of reducing the pivoting angle $\alpha_{pmp}$.

The two actuating pressures $p_{stA}$, $p_{stB}$ are controlled by means of two pressure-reducing valves $18_A$, $18_B$ which are supplied on the input side by the feed pump 14 via a feed pressure line 22. The pressure-reducing valves $18_A$, $18_B$ have respective solenoids a, b, to which excited currents $I_A$, $I_B$ are applied by an electronic control unit 16 via a respective electrical line $20_A$, $20_B$. The two pressure-reducing valves $18_A$, $18_B$ are configured in such a way that the respective actuating pressure $p_{stA}$, $p_{stB}$ is proportional to the respective strength of the current $I_A$, $I_B$.

For the described exemplary embodiment, the first delivery direction of the axial piston pump is linked to the first pressure-reducing valve $18_A$ and to forward delivery of the working pressure medium and to reverse travel of a mobile working machine which has a corresponding hydrostatic traction drive with hydrostatic traction motors. Correspondingly, the opposite or second delivery direction of the axial piston pump is linked to a second pressure-reducing valve $18_B$ with reverse delivery of the working pressure medium and with reverse travel of the mobile working machine.

In the following explanation of the method according to the disclosure it will firstly be assumed that there is forward delivery of the working pressure medium through the working connection A and therefore forward travel of the mobile working machine. As a result of the reversing, reverse delivery of the working pressure medium then occurs correspondingly through the working connection B or reverse travel of the mobile working machine occurs.

FIG. 3 shows the pivoting angle $\alpha_{pmp}$ of the axial piston pump during the reversing process with the profiles of the actuating pressures $p_{stA}$, $p_{stB}$ and the currents $I_A$, $I_B$.

1. The reversing is initiated. The first current $I_A$ for the forward travel drops suddenly with an initiation jump 26 in order to initiate the deceleration. At the same time, the second current $I_B$ for the reverse travel is switched on in order to pre-activate the second pressure-reducing valve $18_B$.

2. In the deceleration, the difference between the currents for the forward travel $I_A$ and for the reverse travel $I_B$ needs to therefore change continuously. Therefore, the current for the reverse travel $I_B$ begins to rise with a ramp as soon as the actuating pressure $p_{stA}$ for the forward travel reaches zero.

3. As long as the deceleration still persists, the actuating pressure $p_{stB}$ for the reverse travel is limited to a "pressure cut-off level" 27. This ensures that the deceleration does not lead to brake load pressures higher than the permissible working pressure $p_A$, $p_B$ on the axial piston pump. In this context, the pressure cut-off of the axial piston pump takes place by means of parameterizable limitation of the second current $I_B$ during the deceleration so that the second actuating pressure $p_{stB}$ does not rise further.

4. If the pivoting angle $\alpha_{pmp}$ is returned to zero, the now relevant centering spring $9_A$ is compensated by means of an equivalent sudden rise in the actuating pressure $p_{stB}$. The latter is reached by means of a so-called zero crossover jump 24 of the second current $I_B$. The first current $I_A$ is switched off.

5. Then, the mobile working machine passes through a further rise in the current for the reverse travel $I_B$ into the reverse-directed acceleration.

FIG. 4 shows a characteristic diagram of the axial piston pump and how this is controlled, for example, by this characteristic diagram in the reversing process. Beginning at a maximum pivoting angle $\alpha_{pmp}$ and 200 bar working pressure $p_A$ or $p_B$ the actuating pressure difference $\Delta p_{st}$ is suddenly reduced (from e.g. 19 bar to 11 bar) in order to initiate the reversing. Then, the actuating pressure difference $\Delta p_{st}$ is reduced further by means of the ramp until the axial piston pump is pivoted back and makes the zero crossover.

Figure 5:
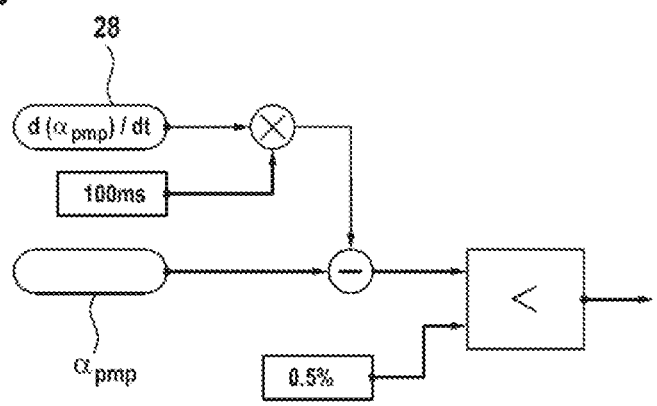
FIG. 5 shows how the zero crossover jump of the current depends on the pivoting angle.

FIG. 5 then shows that the time of the zero crossover jump 24 of the current $I_A$, $I_B$ has to be dependent on a rate of change 28 of the pivoting angle $\alpha_{pmp}$ so that it always gives rise directly to a defined actuating pressure $p_{st}$ and therefore a defined actuating pressure difference $\Delta p_{st}$ (in this case 0 bar). In the signal flow diagram shown in FIG. 5 it is shown that the trigger for the zero crossover is also shifted, apart from the pivoting angle $\alpha_{pmp}$, from its rate of change 28 and from the response dynamics of the actuating pressure $p_{stA}$, $p_{stB}$ with respect to the current $I_A$, $I_B$, that is to say of the pressure-reducing valve $18_A$, $18_B$. In this context, a high rate of change 28 of the pivoting angle $\alpha_{pmp}$ gives rise to further shifting forward of the trigger.

Figure 6:
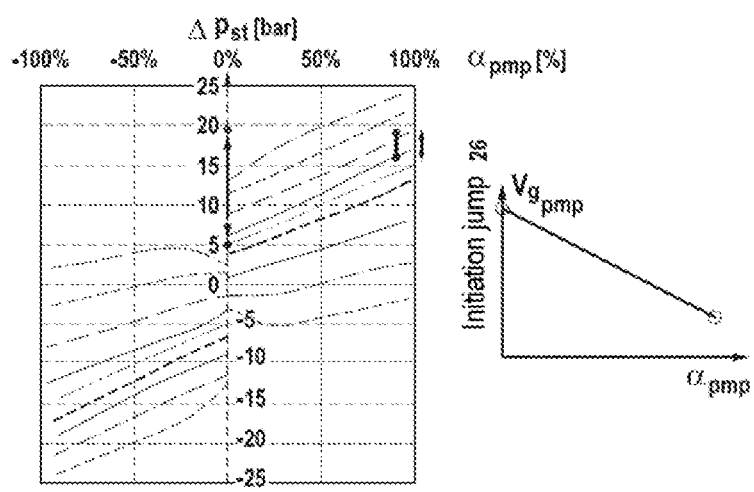
FIG. 6 shows the sudden reduction in the actuating pressure difference at two different pivoting angles in two diagrams.

FIG. 6 shows in the left-hand diagram the sudden reduction in the actuating pressure difference $\Delta p_{st}$ for initiating the reversing function at two different exemplary current pivoting angles $\alpha_{pmp}$. Correspondingly, the level of the initiation jump 26 of the current $I_A$ also depends on the current pivoting angle $\alpha_{pmp}$.

In one application of the method according to the disclosure in the abovementioned traction drive which is driven by an internal combustion engine, a functional extension can serve to protect the internal combustion engine against an excessive rotational speed in the deceleration state of the traction drive.

Figure 7:
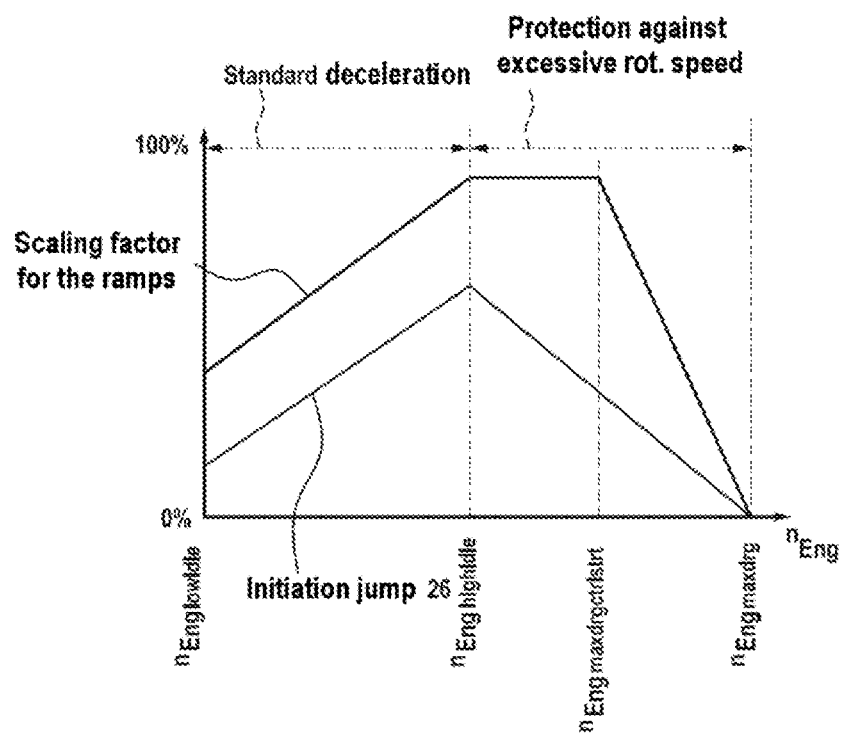
FIG. 7 shows protection of an internal combustion engine against an excessive rotational speed.

For this purpose, according to the illustrations in FIGS. 6 and 7, on the one hand the reduction of the actuating pressures $p_{stA}$, $p_{stB}$ is limited as pilot control in dependence on the pivoting angle $\alpha_{pmp}$, and also the initiation jump 26 and the reduction ramp are influenced in accordance with the pump rotational speed $n_{pmp}$.

FIG. 7 shows a diagram of protection against an excessive rotational speed for the internal combustion engine if the latter can no longer support the desired deceleration. In this context, the following rotational speed values $n_{Eng}$ of the internal combustion engine are plotted in an ascending sequence: lower idling rotational speed $n_{Englowidle}$/maximum working rotational speed $n_{Enghighidle}$/pre-warning rotational speed $n_{Engmaxdrgctrlstrt}$/maximum drag rotational speed $n_{Engmaxdrg}$.

The scaling factor for the ramps is not increased further starting from the point when the maximum working rotational speed $n_{Enghighidle}$ is reached. If the internal combustion engine reaches the pre-warning rotational speed $n_{Engmaxdrgctrlstrt}$, the scaling factor is reduced further. Therefore, if the internal combustion engine risks rotating at an excessive speed, the deceleration is throttled gradually so that the operator does not perceive any surprising decrease in the deceleration.

FIG. 8 shows, as an extension of the method, adjustment of the desired reversing behavior, e.g. in the three stages "gentle", "moderate" and "aggressive".

There are two options for adjusting the reversing for the axial piston pump in a suitable way:
  Option 1: response behavior, deceleration and acceleration are independently adjustable, in this context the dependence on the rotational speed $n_{Eng}$ of the internal combustion engine, that is to say on the position of the accelerator pedal, is not adjustable.
  Option 2: dynamics of the response behavior, deceleration and acceleration are permanently linked to one another. The dynamics are set as a function of the rotational speed $n_{Eng}$ of the internal combustion engine. Accelerator-pedal-dependent behavior can therefore be adjusted and a parameter is required less.

With both options it is possible to adapt the behavior of the axial piston pump by means of percentage values without knowledge of the physics and sequencing of the reversing. These percentage values for the intensity of the reversing or the response behavior in turn scale the physical variables/parameters of the reversing algorithm.

In the case of option 2 the dynamics of the reversing process are set in a manufacturer-specific fashion on the mobile working machine by the person performing the start. As is apparent from FIG. 3, the number of parameters which are to be set is high and the dependencies are complex. A minimum value for a very gentle behavior as well as a maximum value for a very aggressive behavior are preferably stored permanently in the controller for the initiation jump 26, the deceleration ramp in the left-hand early "deceleration" region in FIG. 3 and the acceleration ramp in the right-hand later "acceleration" region in FIG. 3. All three parameters can be adjusted coupled in their defined value range between "gentle" and "aggressive" by means of a single "reversing dynamic" parameter, which has, for example, a value range from 0 to 100%.

In a further preferred embodiment, the reversing dynamics are not only a value but also a function, for example a form of a characteristic curve, of a guide variable, such as for example the position of the accelerator pedal or rotational speed $n_{Eng}$ of the internal combustion engine.

FIG. 8 shows, in an exemplary embodiment, the table for the translation of the "reversing dynamic" parameter in steps 0-50-100% into values for the control function. In this example, the dynamic is additionally a function of the guide variable of the rotational speed $n_{Eng}$ of the internal combustion engine, wherein "low rotational speed" signifies a value close to the lower idling rotational speed and "high rotational speed" signifies a value near to the upper idling rotational speed of the all-rotational-speed regulator.

The person performing the start can simply optimize the driving behavior on the basis of the stored values using the single "reversing dynamic" parameter.

Extending the reversing algorithm constitutes electronically limiting the working pressure $p_A$, $p_B$ in the deceleration phase. For this purpose, the actuating pressure difference $\Delta p_{st}$ is limited in accordance with the pump characteristic according to the algorithm.

A drive unit which has an axial piston pump and an electronic control unit 16 is disclosed. The axial piston pump is pivoted with a method in which pressure-reducing valves $18_A$, $18_B$ which act in opposition to one another are suddenly energized. Since in this respect no orifices are provided in the adjustment device 5, a so-called initiation jump 26 of the excited current $I_A$ gives rise to a sudden reduction in the assigned actuating pressure $p_{stA}$ or the actuating pressure difference $\Delta p_{st}$ formed therefrom. Then, a zero crossover jump 24 of at least the excited current $I_B$ is carried out in order to overcome the centering spring $9_A$ and therefore ensure a continuous zero crossover of the axial piston pump.

LIST OF REFERENCE SYMBOLS

1 Housing
2 Drive unit
3 Swash plate
5 Adjustment device
6 Actuating cylinder
$8_A$ first actuating chamber
$8_B$ second actuating chamber
$9_A$ first centering spring
$9_B$ second centering spring
10 Drive shaft
14 Feed pump
16 electronic control unit
$18_A$ first pressure-reducing valve
$18_B$ second pressure-reducing valve
$20_A$ first electrical line
$20_B$ first electrical line
22 Feed pressure line
24 Zero crossover jump
26 Initiation jump
27 Pressure cut-off level
28 Rate of change
$\alpha_{pmp}$ Pivoting angle of the axial piston pump
A first working connection
B second working connection
$I_A$ first current
$I_B$ second current
$n_{Eng}$ rotational speed of the internal combustion engine
$n_{Englowidle}$ lower idling rotational speed of the internal combustion engine
$n_{Enghighidle}$ maximum working rotational speed of the internal combustion engine
$n_{Engmaxdrgctrlstrt}$ pre-warning rotational speed of the internal combustion engine
$n_{Engmaxdrg}$ maximum drag rotational speed of the internal combustion engine
$n_{pmp}$ rotational speed of the axial piston pump
$p_{stA}$ first actuating pressure
$p_{stB}$ second actuating pressure
$p_A$ first working pressure
$p_B$ second working pressure
$\Delta p_{st}$ actuating pressure difference
T Tank
$Vg_{pmp}$ Displacement volume of the axial piston pump

The invention claimed is:

1. A method for reversing a pivotable axial piston pump that includes an adjustment device, which has a double-acting actuating cylinder with (i) two actuating chambers acting in opposition to one another and (ii) two centering springs acting in opposition to one another, wherein a respective actuating pressure is applied to each of the two actuating chambers via one respective pressure-reducing valve, which is controlled by a respective current, the method comprising:
   detecting a pivoting angle of the axial piston pump;
   determining a time of a zero crossover of the pivoting angle; and
   suddenly changing at least one of the respective actuating pressures at approximately the time of the zero crossover by at least one zero crossover jump of the respective current associated with the at least one of the respective actuating pressures.

2. The method according to claim 1, wherein the at least one zero crossover jump of the respective current occurs in accordance with a rate of change of the pivoting angle shortly before the zero crossover.

3. The method according to claim 1, further comprising:
   calculating an actuating pressure difference as a first actuating pressure in a first actuating chamber of the two actuating chambers minus a second actuating pressure in a second actuating chamber of the two actuating chambers,
   wherein the actuating pressure difference is suddenly raised or suddenly lowered approximately at the time of the zero crossover in accordance with a reversing direction of the axial piston pump.

4. The method according to claim 3, wherein the sudden raising or lowering of the actuating pressure difference occurs by a sum of the equivalents of the two centering springs.

5. The method according to claim 1, wherein the detecting of the pivoting angle includes measuring the pivoting angle with a pivoting angle sensor.

6. The method according to claim 1, wherein the detecting of the pivoting angle includes calculating the pivoting angle based on a volume flow balance from a consumer volume flow, a leak, a rotational speed of the axial piston pump, and a displacement volume per revolution of the axial piston pump.

7. The method according to claim 1, wherein the determining of the zero crossover includes empirically parameterizing the zero crossover based on a velocity of a mobile working machine.

8. The method according to claim 1, further comprising:
   executing an initiation jump of at least one of the respective currents if a pivoting back of the pivoting angle or a deceleration of a mobile working machine is to begin or begins.

9. The method according to claim 8, further comprising:
   reducing a first current of the respective currents, at least temporarily, along a first ramp between the initiation jump and the zero crossover jump; and/or
   increasing a second current of the respective currents, at least temporarily, along a second ramp.

10. The method according to claim 9, further comprising:
    scaling at least one of (i) the initiation jump, (ii) at least one of the first and second ramps, and (iii) a pressure cut-off level of the axial piston pump using a parameter that is a function of a velocity of the mobile working machine.

11. The method according to claim 1, wherein a pressure cut-off of the axial piston pump occurs by parameterizable limitation of the respective currents.

12. The method according to claim 1, further comprising:
    protecting an internal combustion engine of a mobile working machine against an excessive rotational speed by throttling deceleration based on a characteristic curve or mathematical function which is comparable to the characteristic curve.

13. The method according to claim 12, wherein parameters of the mathematical function are adjusted jointly and coupled to one another in accordance with a desired behavior of the mobile working machine via a parameterizing interface.

14. A drive unit for a traction drive, the drive unit comprising:
    a pivotable axial piston pump having an adjustment device that includes:
    a double-acting actuating cylinder comprising:
        two actuating chambers which act in opposition to one another; and
        two centering springs which act in opposition to one another; and
    one pressure-reducing valve associated with each of the two actuating chambers and configured to supply the respective actuating chamber with actuating pressure medium; and
    an electronic control unit configured to:
        detect a pivoting angle of the axial piston pump;
        determine a time of a zero crossover of the pivoting angle; and
        suddenly change a respective actuating pressure in at least one of the respective actuating chambers at approximately the time of the zero crossover based on a zero crossover jump of an assigned current of the associated pressure-reducing valve.

15. A hydrostatic traction drive for a mobile working machine comprising:
    a drive unit comprising:
    a pivotable axial piston pump having an adjustment device that includes:
        a double-acting actuating cylinder comprising:
            two actuating chambers which act in opposition to one another; and
            two centering springs which act in opposition to one another; and
        one pressure-reducing valve associated with each of the two actuating chambers and configured to supply the respective actuating chamber with actuating pressure medium; and
    an electronic control unit configured to:
        detect a pivoting angle of the axial piston pump;
        determine a time of a zero crossover of the pivoting angle; and
        suddenly change a respective actuating pressure in at least one of the respective actuating chambers at approximately the time of the zero crossover based on a zero crossover jump of an assigned current of the associated pressure-reducing valve; and
    at least one hydraulic motor that is fluidically connected to the axial piston pump in a closed circuit.

16. The hydrostatic traction drive according to claim 15, wherein:
    the electronic control unit is further configured to calculate or define an actuating pressure difference as a first actuating pressure in a first actuating chamber of the two actuating chambers minus a second actuating pressure in a second actuating chamber of the two actuating chambers, and
    the actuating pressure difference is suddenly raised or suddenly lowered at approximately the time of the zero crossover in accordance with a type of change of a direction of travel of the mobile working machine.

* * * * *